April 10, 1962 N. L. DAVIS 3,028,962
SINK AND FLOAT SEPARATION APPARATUS
Filed June 2, 1958 3 Sheets-Sheet 1

INVENTOR.
*Nelson L. Davis*
BY
*Parker & Carter*
*Attorneys*

United States Patent Office 3,028,962
Patented Apr. 10, 1962

3,028,962
SINK AND FLOAT SEPARATION APPARATUS
Nelson L. Davis, R.R. 1, Box 248, McHenry, Ill.
Filed June 2, 1958, Ser. No. 739,378
5 Claims. (Cl. 209—172.5)

My invention relates to improvements in sink and float separation apparatus and has for one object to provide a sink and float vessel and system which will permit sink and float separation of large size particles.

The methods and apparatus heretofore used in sink and float separation of solids such as coal have been limited to a narrow range of particle sizes. As coal came from the mine it has been screened to select the various size ranges for separate treatment. Oversize particles have either been crushed to a small size for sink and float separation, or have been hand picked. Crushing is expensive, before the removal of mine rock, takes time, and increases the amount of fine refuse which is especially difficult to remove from fine coal. Hand picking is expensive, slow and inaccurate.

To avoid these difficulties my invention includes an apparatus where large particles in some cases as much as several feet in diameter, may be subjected to sink and float separation.

Figure 1:
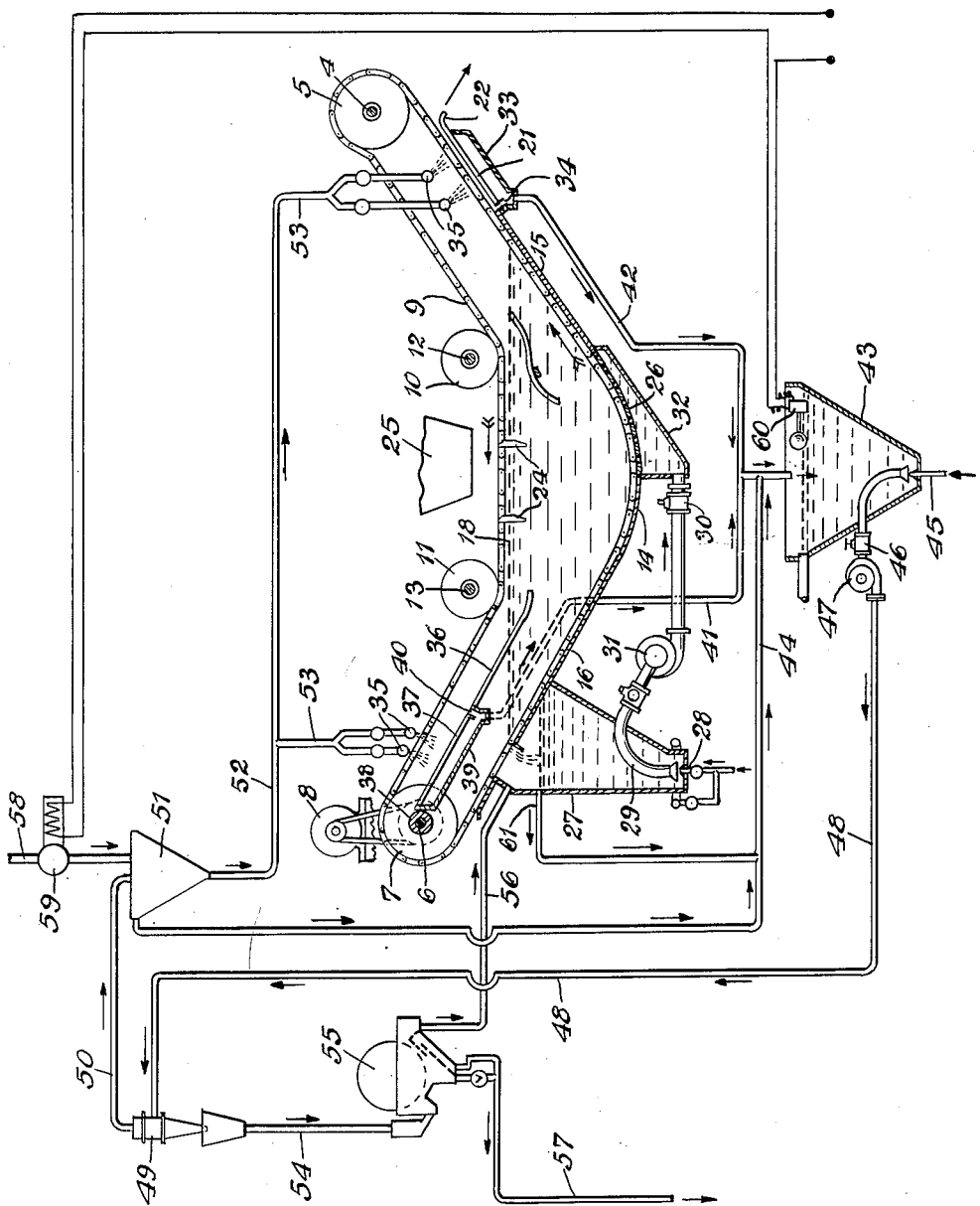
Figure 2:
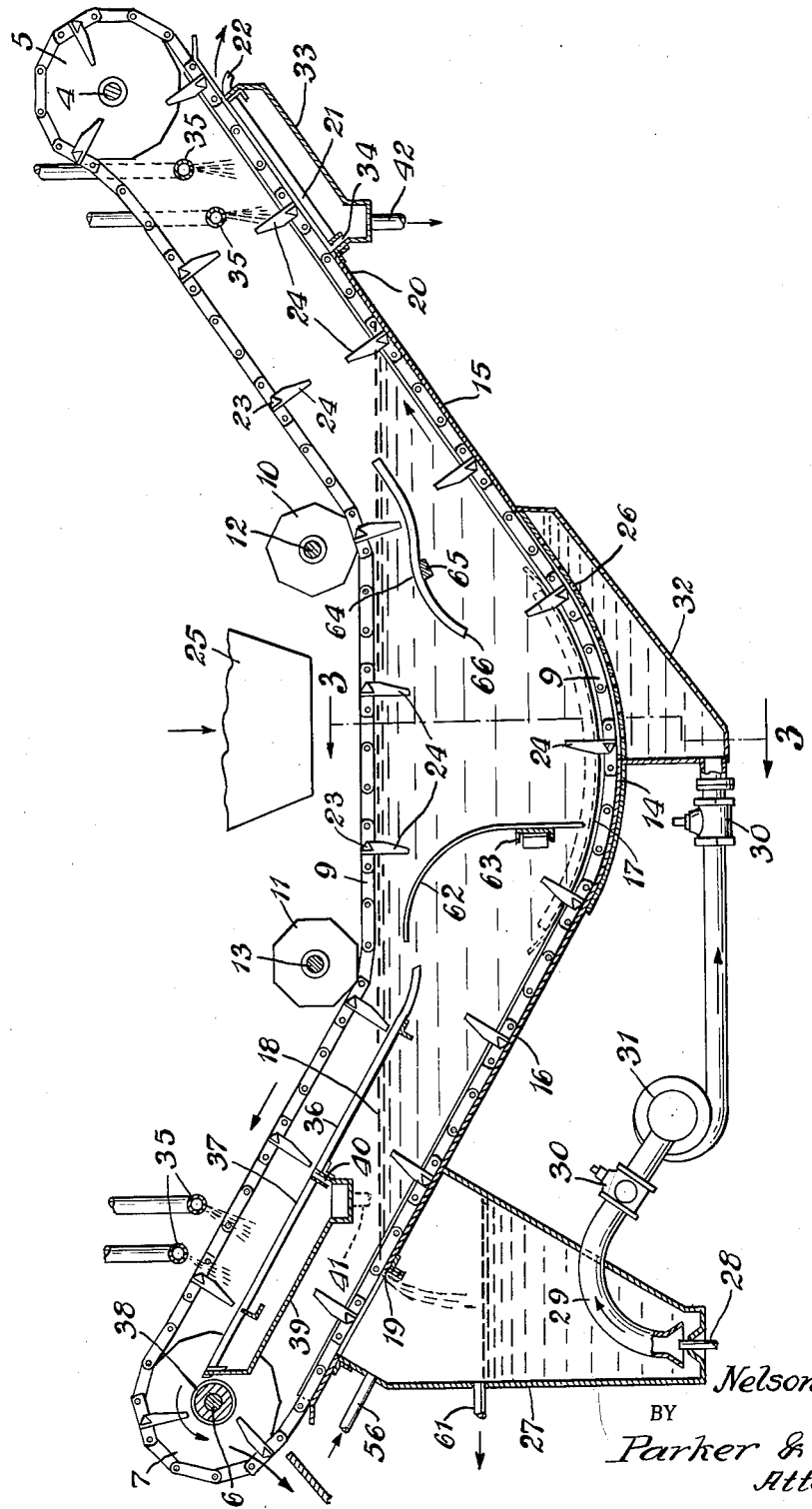
Figure 3:
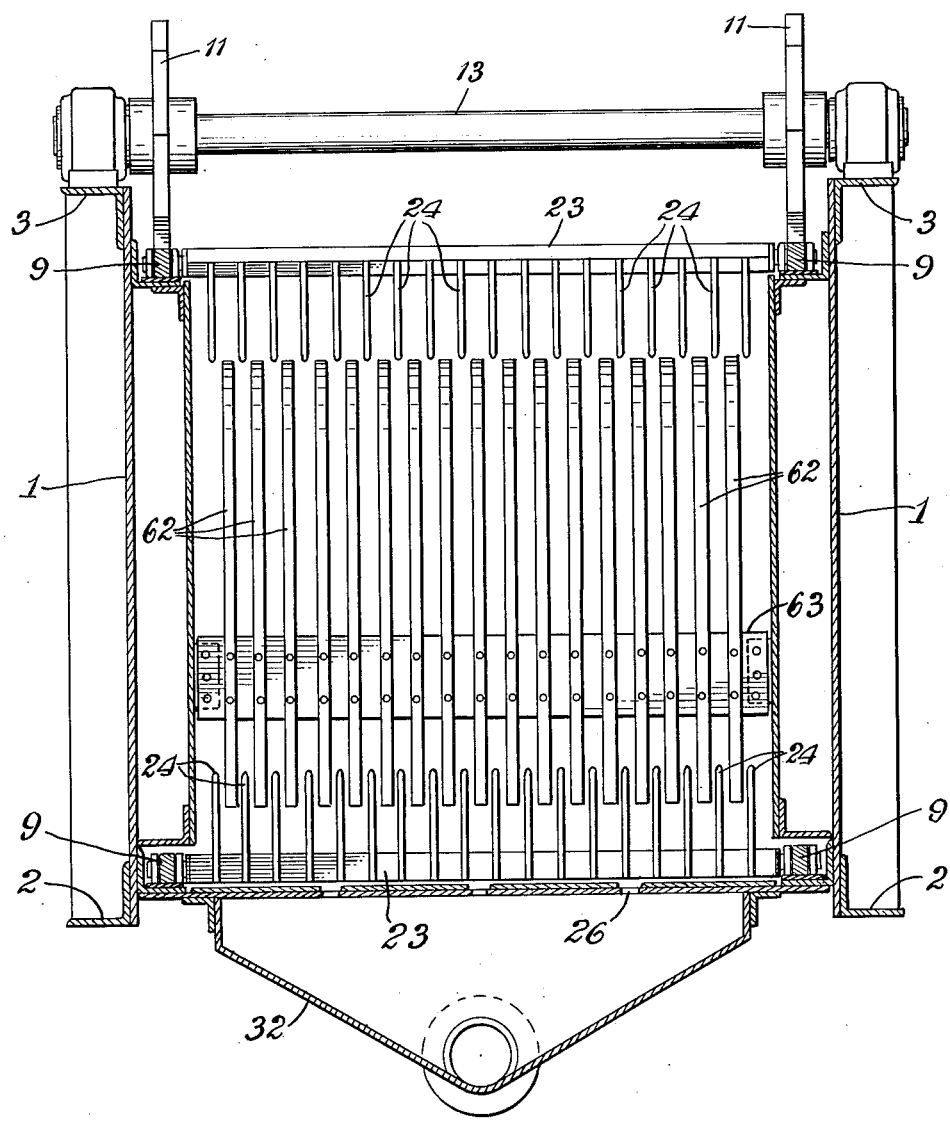

My invention is illustrated more or less diagrammatically in the accompanying drawings, wherein:

FIGURE 1 is a diagrammatic flow sheet;
FIGURE 2 is a side elevation of the vessel of FIGURE 1;
FIGURE 3 is a section along the line 3—3 of FIGURE 2.

Like parts are indicated by like characters throughout the specification and drawings.

My sink and float vessel is generally triangular in vertical longitudinal contour and generally rectangular in vertical transverse contour. Side walls 1 are reenforced by frame members 2, 3 which extend upwardly at both ends of the vessel to carry at one end the tail shaft 4 with idler sprockets 5, and at the other end, the drive shaft 6 with drive sprockets 7. Motor 8 through drive shaft 6 and drive sprockets 7 drives the endless chains 9 on either side of the vessel. Intermediate idler sprockets 10 and 11 on idler shafts 12 and 13 maintain the upper portion of the chain just above the level of the liquid in the bath. The lower portion of the chain rests by gravity upon the bottom of the tank and travels therealong at the bottom of the bath.

The floor of the tank includes a central curved portion 14, with tangential flat portions 15, 16 extending upwardly from either end of the curved floor portion 14. These floor sections, together with vertical side walls, define a fluid-tight tank.

The level of the parting liquid 18 is fixed by the weir 19 which extends across between the side walls 1 at the upper boundary of the flat floor section 16. The floor section 15 extends upwardly above the level of the bath as indicated at 20. A screen of parallel bars indicated at 21 is in upward continuation of the floor portion 20 and terminates below the idler shaft 4, the screen bars being curved as at 22 to ease the discharge of material therefrom. The floor 15 and the screen bars 21 serve as guide means for the sink material.

The space between the two chains 9 is substantially equal to the width of the tank. The chains carry, extending across the tank, a plurality of tie bars 23 which carry inwardly extending tines 24 presented edge on to the bath as they pass through it so that a minimum of pumping action will occur as a result of chain travel. The rectangular space defined between any pair of cross bars 23 and the chains 9 is big enough to receive the largest size of particle to be treated and the rectangular space between tines or propeller fingers 24 and bars 62 is sufficiently narrow to retain the smallest size of particle to be treated.

The flotation medium, perhaps water with finely divided magnetite in suspension, enters the tank through the apertures 26 in the curved floor portion 14 and is supplied positively thereto in continuous upward flow at a rate substantially equal to the settling rate of the magnetite.

Since the apertures are generally on the right hand side of the vertical transverse central line of the tank as in FIGURE 2 and since the weir 19 is on the opposite side of the central line, the medium tends to flow not merely upward but also longitudinally toward the discharge weir. Since sink and float separation takes place primarily in the central portion of the tank, the medium remains at constant density in that area, but the upward flow of the medium is so very slight that it never can provide any measurable upward current separation effect. Separation is, as a result of the difference in specific gravity of the solids, a direct float and sink operation.

The weir sump 27 receives the medium as it flows over the weir 19 and the medium is discharged therefrom through the duct 29 to the centrifugal pump 31 which positively forces the medium into the hopper 32 for upward discharge and recirculation through the float 14 into the bath. Air injector 28 is used only during the starting time to resuspend settled magnetite and valves 30 are used only when it is necessary to disconnect pump 31.

The refuse screen 21, drains the refuse or sink material immediately above the hopper 33 as the refuse is propelled upwardly by the tines 24 on the chains 9. There is clearance between the lower ends of the screen bars 21 and the upper edge of the floor 20 so that drainage water and rinse water from the spray heads 35 flows into the hopper 33 and any water which trickles down the screen bars 21 is discharged through the duct 34 into the hopper 33 and cannot return to the bath to dilute it.

The float coal as it is propelled toward the left in FIGURE 3 along the surface of the bath by the blades 24 travels up along the longitudinal bar float coal drain grid 36 which at its lower end below the level of the bath is generally concentric with the idler shaft 13 and so positioned that as the chain travels upwardly the ends of the fingers or tines 24 are generally tangential to the grid bar and are able to propel the coal upwardly therealong.

The rinse water grid bars 37 are in general alignment with the bars 36, but there is clearance between them. These bars serve as guide means for the float coal. The rinse water hopper 39 receives the rinse water trickling off the ends of the bars 37, passes through the duct 40 for discharge into the hopper 39. Thus rinse water at this end of the vessel cannot return to the bath to dilute it.

The coal as it is propelled upwardly along the bars 36 and 37 is drained of most of the flotation medium before it reaches the upper ends of the bars 36. Flotation media are rinsed thereafter from the coal as it passes along the bars 37 and the rinsed coal is finally discharged over the roller 38, having been separated by flotation and freed of substantially all, if not all of the flotation medium. Since the distance between the cross bars joining the two chains on each side of the vessel is substantially the same as the distance between such cross bars longitudinally of the chain, any piece of coal which is small enough to be discharged over the roller 38 will pass easily through the chain for discharge from the apparatus.

Rinse water hoppers 33 and 39 and weir sump 27 drain through ducts 41, 42 and 44 to the recovery sump 43. Air injector 45 is available for use if needed at start up time. Valve 46 discharges to pump 47, which in turn discharges through duct 48 to cyclone thickener 49. Clarified water from cyclone thickener 49 is discharged through duct 50 to clear water head tank 51 which supplies rinse water to the spray heads 35 to rinse the solids traveling along the rinsing screens or bars 21 and 37.

The thickened medium from the cyclone thickener 49 passes through duct 54 to magnetic separator 55 which returns the magnetite through duct 56 to sump 27 for recirculation with the bath. Tailings from the magnetic separator are discharged through duct 57 for washing or other treatment.

Fresh water is supplied to the clear water head tank 51 through duct 58 controlled by solenoid valve 59 responsive to the float control 60 on the sump 43.

There will always be some water lost from the system on the sink and float solids and with the tailings from the magnetic separator. Wet coal fed to the bath may add water to the system. The level of the bath is maintained constant by the weir 19. The level in the sump 27 may vary somewhat. The level of the medium in the weir sump 27 is controlled by discharge through duct 61 and 44 to recovery sump 43. Loss of water from or addition of water to the system is compensated for by the liquid level float control 60 and valve 59.

As the coal is discharged through the hopper 25 between the chains 9 on the upper reach, it drops down into the sink and float bath. The lighter float coal tends to rise to the surface, the heavier sink or refuse tends to settle to the bottom of the bath. The float coal rising to the surface is urged toward float coal discharge by the tines 24 as the chain carrying them passes along adjacent to the surface of the liquid. There is always danger that a particular piece of coal might happen to be caught between the tines and the lower ends of the grid bars 36. The coal under those circumstances might be crushed and damage to the equipment might result. To prevent this, a multiplicity of spring forks 62 are supported on a cross structure 63 between the walls 1. These forks curve upwardly toward the ends of the grid bars 36 generally tangent at their upper ends to a plane parallel with the level of the bath. Any piece of coal which could be caught between the tines and the grid at its lower end will first contact the spring fingers 62 which will tend to raise and orient the coal piece so that each piece of coal will be aligned and oriented to feed into the space above the grid 36.

Refuse will sink to come into the path of the tines extending upwardly from the chain as it travels along the bottom of the tank and will be urged toward the right into the space below the fixed guide bars 64 supported on the cross structure 65 between the side walls 1. The clearance between the lower inboard ends 66 of the guide bars 64 and the nearest possible approach of the tines 24 is as large as the largest piece to be cleaned so each piece can enter into the space between the tines 24 and the bar 64. The grid bars 64 just clear the tines on the upper reach of the chain and protect them against contact with any sink material that might be pushed up into the path of the tines. Any sink material that is too big to pass between the lower tines, on the way to sink material discharge and the guide bars 64, will drop or be pushed back and engaged by the next group of tines.

The spring barrier shown at 62 and 63 in FIGURE 2 is omitted from FIGURE 1 in the interest of clearness but is an essential part of the structure.

Spring bars 62 act as a flexible barrier for large pieces of float coal as well as large or small pieces of submerged coal which are slowly rising to the surface and which are being propelled in the direction of grid bars 36 by tines 24. In such cases, the spring bars 62 will be encountered by the leftwardly moving lumps and in some cases these spring bars will deflect causing a reactionary force which tends to lift the lumps upwardly to a submerged depth that will permit such lumps to safely clear grid bars 36, thus avoiding the hazard of lumps being forcibly jammed between tines 24 and grid bars 36.

The use and operation of my invention are as follows:

Coal as it comes from the mine after coarse size screening, is fed directly into the float and sink bath from the feed hopper which discharges the coal through the openings formed between the two chains and each pair of cross bars. The level of the bath is maintained by the discharge weir. The medium being constantly forced into the vessel from the bottom at a rate such that upward flow of the medium is approximately the same as and not less than the sink rate of the magnetite. No harm will be done if upward flow is a little higher provided that it is not enough to have any upward current classification effect.

As the medium flows upwardly from the medium supply grid toward the weir generally uniform bath density prevails in the area where sink and float separation occurs and where the float, the important product, is on its way to the discharge point. If the density of the medium on the right hand end of the bath in FIGURE 2 should happen to be somewhat lower than that elsewhere no harm would be done because only sink material is found in that area on its way to the refuse discharge.

When the coal has been separated in the center of the vessel by sink and float from the refuse, the coal rising toward the surface of the bath is moved toward the left by the tines carried by the chain and the refuse, having sunk to the bottom is moved toward the right towards its discharge. Both sink and float are separately propelled in opposite directions and positively raised above the level of the bath to discharge as finished products.

Float particles as they rise into the area of the tines on their left hand travel will be lifted by the spring fingers in such wise as to prevent their being crushed between the tines and the coal drainage screen. As the coal travels up along the drainage screen or grids, it is raised above the bath level and the medium can drain directly back into the bath.

As the coal proceeds further, it reaches the rinsing screen in alignment with the drainage screen. The coal is rinsed to wash off any adhering medium and is discharged from the bath by the conveying mechanism.

As the coal is raised above the level of the bath medium drains off it for direct return to the bath but some of the media remains on the coal and to prevent loss of such remaining media the coal is rinsed. The media in the rinse water is recovered therefrom and is returned to the bath system. Thus the coal and refuse leaves the system without any substantial loss of media from the system.

Referring now to the sink material, the refuse is conveyed upwardly by the tines along the floor of the tank to a point above the level of the liquid. Liquid drains off, flowing back into the bath as the refuse is propelled upwardly to the refuse rinsing screen. The refuse is rinsed, being propelled upwardly to discharge through the chain over the curved ends of the refuse screen.

Thus coal in drained and rinsed condition is raised through the surface of the liquid for discharge from one end of the bath and refuse similarly raised and discharged from the other end of the bath.

While the heaviest particles sink and the lightest particles float, there are likely to be teeter particles somewhere in between. They may go up or go down so there is the possibility of teeter particles moving toward the refuse discharge end of the bath. At the point where the tines on the upward moving part of the chain at the bottom of the bath are about to emerge and at the point where the tines on the downward moving part of the chain are about to enter the bath, they come rather close together and there is a possibility that a teeter particle might not be between the up and down moving tines.

The deflector bars in the path adjacent the refuse discharge end of the bath will deflect any such teeter particles below the path of the downward going tines and thus avoid any crushing of particles between the tines.

It is, of course, essential that the level of the liquid in the bath remains constant. It is also essential that the density or concentration of the magnetite remains constant.

The rate of supply of medium to the bottom of the bath will be controlled by the pump in the usual manner to give the flow necessary to maintain the desired head over the weir. Thus the level of liquid in the bath itself remains constant just as long as there is liquid in the weir sump because the capacity of the pump with liquid available is sufficient to maintain a head over the weir. The magnetic separator recovers most if not all of the magnetite washed from the solids and returns it to the weir sump so the specific gravity of the bath is maintained generally constant.

The amount of rinse water sprayed over the sink and float solids after they have left the bath is uniform and returns to the recovery sump and does not interfere with the level of the bath. However, some liquid is withdrawn from the bath with the sink and float. That is a variable depending upon the size of the particles and some liquid may be added to the bath with the feed. That is a variable depending on the size of particles and the amount of water on them. Thus there may be an increase or decrease of the amount of liquid fed to and taken from the bath and this is taken care of by the overflow over the weir. It may result, however, in an increased amount of liquid in the system. The recovery sump receives diluted medium from the rinsing screen, undiluted medium from the weir sump and fresh water from the heat tank. Diluted medium is pumped from the recovery sump to the cyclone thickener. The liquid overflow from the cyclone goes to the head tank to be used as rinse water. The thickened medium from the cyclone goes to the magnetic separator. The magnetic media are returned therefrom to the weir sump for recirculation through the system with the undiluted medium. The non-magnetic solids and the liquid from the magnetic separator are discharged from the system, perhaps for clarification and reuse as fresh water. Other water is lost from the system with the coal and refuse as they are discharged from the vessel.

The system receives water from two sources. It comes in with the coal presented for treatment and it is supplied as fresh water to the head tank. It is essential that the amount of water in the system remain generally constant so the entrance and exit of the water must be balanced. If more water comes in with wet coal than is lost as above indicated, the level of liquid in the recovery sump will rise above the sump discharge and will drain off. If less water and this is the usual case, enters the system with the coal than is discharged from the system, the level of the recovery sump will fall and such reduction in level is reflected in control of the valve which supplies fresh water to the head tank. The water from the head tank can come from any suitable source. It can conveniently come from the clarifier not shown which would clarify the water from the magnetic separator for return to the system.

As the coal and the refuse leave the bath, most of the medium adhering to them will drain off, but there will be a very small amount of medium left adhering to the coal and refuse, and if this were not recovered, it would result in finally attenuating the concentration of magnetite to a point at which float and sink would not be separated in the desired range.

The rinsing heads therefore after drainage wash off particles of the medium and the rinse water passes immediately through the main sump, the cyclone thickener and the magnetic separator so as to return the recovered media directly to the weir sump.

I claim:
1. In a vessel adapted to contain sink and float separating bath means for feeding material to the bath for separation, a screen grid extending diagonally upward from below, to above the level of the bath, a conveyor chain, means for guiding it upwardly from the bath along a path generally parallel to the grid, curved spring fingers between the feed and the grid extending upwardly within the bath and terminating adjacent the lower ends of the screen grid, the fingers being generally tangent to a horizontal plane at their termination adjacent and pointing toward the lower end of the grid.

2. In a vessel adapted to contain a sink and float separating bath means for meeting material to the bath for separation, a screen grid extending diagonally upward from below, to above the level of the bath, a conveyor chain, means for guiding it upwardly from the bath along a path generally parallel to the grid, curved spring fingers between the feed and the grid extending upwardly within the bath and terminating adjacent the lower ends of the screen grid, the fingers being generally tangent to a horizontal plane at their termination adjacent and pointing toward the lower end of the grid, and extending in the same general direction as the direction of travel of the chain as it passes along the grid.

3. In a vessel adapted to contain a sink and float separating bath means for feeding material to the bath for separation, a screen grid extending diagonally upwardly from below, to above the level of the bath, a conveyor chain, means for guiding it along a generally horizontal path parallel to and adjacent the surface of the bath, means for guiding it upwardly from the bath along a path generally parallel to the grid, material propelling members extending downwardly from the chain into the bath of such length as to terminate adjacent the grid, curved spring fingers below the horizontal portion of the chain between the feed and the grid extending upwardly toward and terminating adjacent the lower ends of the grid, the ends of the fingers being generally tangent to a horizontal plane adjacent the lower end of the grid and extending in the direction of travel of the chain as it passes the surface of the bath.

4. In a vessel adapted to contain a sink and float separating bath means for feeding material to the bath for separation, means for supplying a fluid medium to the bath for upward flow from the bottom thereof, a weir at one end of the bath over which the medium may flow, means for propelling float material along and for positively withdrawing it from above the surface of the bath in the general direction of the flow of medium toward the weir, a multiplicity of spring fingers extending upwardly from adjacent the bottom of the bath curved in the general direction of flow of the medium between the feed and the grid and interposed in the path of the float material as it is propelled toward discharge.

5. In a vessel adapted to contain a sink and float separating bath means for feeding material to the bath for separation, a screen grid extending diagonally upward from below to above the level of the bath, means for supplying a fluid medium to the bath for upward flow from the bottom thereof, a weir at one end of the bath over which the medium may flow, means for propelling float material along and for positively withdrawing it from above the surface of the bath in the general direction of the flow medium toward the weir, a multiplicity of spring fingers extending upwardly from adjacent the bottom of the bath curved in the general direction of flow of the medium between the feed and the grid and interposed in the path of the float material as it is propelled toward discharge, the means for propelling the material including a conveyor chain, means for guiding it upwardly from the bath along a path generally parallel to the grid, the upper ends of the spring fingers being adjacent the lower ends of the screen grid.

(References on following page)

References Cited in the file of this patent

UNITED STATES PATENTS

| | | |
|---|---|---|
| 994,654 | Parker | June 6, 1911 |
| 1,209,654 | Anderson | Dec. 26, 1916 |
| 1,870,613 | Du Pont | Aug. 9, 1932 |
| 2,328,428 | DeKoning | Aug. 31, 1943 |
| 2,521,152 | Davis | Sept. 5, 1950 |
| 2,619,229 | Leeman | Nov. 25, 1952 |
| 2,781,906 | Fontein | Feb. 19, 1957 |

FOREIGN PATENTS

| | | |
|---|---|---|
| 552,399 | Great Britain | Apr. 6, 1943 |
| 633,684 | Great Britain | Dec. 19, 1949 |